US008325990B2

(12) United States Patent
Abe et al.

(10) Patent No.: US 8,325,990 B2

(45) Date of Patent: Dec. 4, 2012

(54) BIOLOGICAL INFORMATION STORING APPARATUS, BIOLOGICAL AUTHENTICATION APPARATUS, DATA STRUCTURE FOR BIOLOGICAL AUTHENTICATION, AND BIOLOGICAL AUTHENTICATION METHOD

(75) Inventors: Hiroshi Abe, Tokyo (JP); Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1091 days.

(21) Appl. No.: 12/211,669

(22) Filed: Sep. 16, 2008

(65) Prior Publication Data

US 2009/0080710 A1 Mar. 26, 2009

(30) Foreign Application Priority Data

Sep. 21, 2007 (JP) ................................ P2007-245608

(51) Int. Cl.
*G06K 9/00* (2006.01)
*G06F 7/04* (2006.01)

(52) U.S. Cl. ............. 382/115; 382/218; 348/156; 726/2

(58) Field of Classification Search ........................ None
See application file for complete search history.

(56) References Cited

U.S. PATENT DOCUMENTS

| | | | | |
|---|---|---|---|---|
| 6,871,287 | B1 * | 3/2005 | Ellingson | 726/9 |
| 6,957,770 | B1 * | 10/2005 | Robinson | 235/382 |
| 6,980,670 | B1 * | 12/2005 | Hoffman et al. | 382/115 |
| 7,004,389 | B1 * | 2/2006 | Robinson et al. | 235/382 |
| 7,120,607 | B2 * | 10/2006 | Bolle et al. | 705/64 |
| 7,269,737 | B2 * | 9/2007 | Robinson et al. | 713/186 |
| 7,367,049 | B1 * | 4/2008 | Robinson et al. | 726/2 |
| 7,836,485 | B2 * | 11/2010 | Robinson et al. | 726/2 |
| 7,941,664 | B2 * | 5/2011 | Wheeler et al. | 713/170 |
| 8,001,387 | B2 * | 8/2011 | Lee et al. | 713/186 |
| 2007/0025600 | A1 * | 2/2007 | Ghebreyesus | 382/124 |

FOREIGN PATENT DOCUMENTS

| | | |
|---|---|---|
| JP | 2001-273498 | 10/2001 |
| JP | 2001-274897 | 10/2001 |
| JP | 2004-070638 | 3/2004 |
| JP | 2005-316750 | 11/2005 |
| JP | 2006-163875 | 6/2006 |
| JP | 2007-34521 | 2/2007 |

* cited by examiner

*Primary Examiner* — Manav Seth

(74) *Attorney, Agent, or Firm* — Finnegan, Henderson, Farabow, Garrett & Dunner, L.L.P.

(57) ABSTRACT

A biological information storing apparatus includes: a biological information storing unit for storing biological information for authenticating reception of a first service; a biological information acquisition unit for acquiring biological information for authenticating reception of a second service different from the first service; and a determination unit for determining whether the biological information acquired by the acquisition unit and the biological information stored in the storing unit coincide with each other, wherein when the determination unit determines that the biological information acquired by the acquisition unit and the biological information stored in the storing unit coincide with each other, either the biological information acquired by the acquisition unit or the biological information stored in the storing unit is selected and stored into the storing unit as biological information for authenticating the reception of the first service and the second service.

9 Claims, 7 Drawing Sheets

BIOLOGICAL INFORMATION STORING APPARATUS, BIOLOGICAL AUTHENTICATION APPARATUS, DATA STRUCTURE FOR BIOLOGICAL AUTHENTICATION, AND BIOLOGICAL AUTHENTICATION METHOD

CROSS REFERENCES TO RELATED APPLICATIONS

The present invention contains subject matter related to Japanese Patent Application JP2007-245608 filed in the Japanese Patent Office on Sep. 21, 2007, the entire contents of which being incorporated herein by reference.

BACKGROUND OF THE INVENTION

1. Field of the Invention

The present invention relates to a biological information storing apparatus, a biological authentication apparatus, a data structure for biological authentication, and a biological authentication method, and is suitably applicable, for example, to biological authentication.

2. Description of the Related Art

The use of living bodies for authentication purposes has become increasingly prevalent. Biological authentication apparatuses, when mounted on portable communication devices such as a cellular phone, also facilitate providing authentication processing to intended parties to communicate anywhere through the portable communication devices. Under the circumstances, it is becoming increasingly important for portable communication devices to mount biological authentication apparatuses. For example, there have been proposed some credit cards and bank cards that mount a biological authentication apparatus (for example, refer to Jpn. Pat. Appln. Laid-Open Publication No. 2007-034521).

SUMMARY OF THE INVENTION

Now, in such cases that user-specific information is exchanged with a predetermined computer system over the Internet, passwords are typically entered for user accounts. Biological information is expected to be applied in the future instead of user accounts and passwords.

In one of these cases, e.g., where a portable communication device is used to receive services from a predetermined server, an authentication apparatus mounted on this portable communication device may have its user input a finger vein image, extract vein information pertaining to veins from the vein image, and register the same into its internal memory when first receiving a service from the server. When receiving services from the server subsequently, the authentication apparatus may have the user input a finger vein image, and collate the vein information extracted from that vein image with the vein information registered in the internal memory.

Take the cases of receiving services from a plurality of servers, such as when receiving an account-related service from a bank server and receiving a commerce-related service from a shopping server as well. Here, the user may input the vein image of the same finger for the different services because of such reasons as a complication for the user to remember by himself/herself which finger's vein image has been registered for which server.

In this case, the authentication apparatus registers the identical biological information in the memory with respect to each of the servers, with the problem of wasting the memory capacity. This problem also applies to personal computers and the like on which high-capacity hard disks are mounted, whereas it is particularly significant to portable communication devices and other terminals that are incapable of high-capacity memories.

In addition, biological information is more valuable than passwords, and is thus stored in a tamper-resistant storage area or other areas of higher safety as compared to other information. As a result, the capacity cannot be increased easily, so that the areas available to store biological information tend to be small.

Furthermore, biological information, even if retained as compressed images, can easily saturate the memory capacity when the amount of data of the images to be retained increases. For example, a tamper resistant memory having a capacity of 8 Kbytes is capable of saving 16 pieces of biological information, provided that a single piece of biological information is 512 bytes in amount. Even this tamper resistant memory can be saturated in capacity, however, as services increase.

The present invention has been achieved in view of the foregoing. It is thus a general purpose of the present invention to propose a biological information storing apparatus, a biological authentication apparatus, a data structure for biological authentication, and a biological authentication method that are capable of reducing the unnecessary use of memory and performing biological authentication for each of a plurality of services.

To solve the foregoing problems, one of the aspects of the present invention provides a biological information storing apparatus which includes: a biological information storing unit for storing biological information for authenticating reception of a first service; a biological information acquisition unit for acquiring biological information for authenticating reception of a second service different from the first service; and a determination unit for determining whether or not the biological information acquired by the biological information acquisition unit and the biological information stored in the biological information storing unit coincide with each other. If the determination unit determines that the biological information acquired by the biological information acquisition unit and the biological information stored in the biological information storing unit coincide with each other, either the biological information acquired by the biological information acquisition unit or the biological information stored in the biological information storing unit is selected and stored into the biological information storing unit as biological information for authenticating the reception of the first service and the second service.

Another aspect of the present invention provides a biological authentication apparatus which includes: a biological information storing unit having biological information stored in a predetermined area thereof; a first authentication unit for authenticating reception of a first service based on the biological information read from the predetermined area; and a second authentication unit for authenticating reception of a second service different from the first service, based on the biological information read from the predetermined area.

Another aspect of the present invention provides a data structure for biological authentication which includes: a first authentication biological information storing area for storing first authentication biological information to be read when authenticating reception of a first service; and a second authentication biological information storing area for storing second authentication biological information to be read when authenticating reception of a second service different from the first service. If the first authentication biological information and the second authentication biological information coincide with each other, the first authentication biological information storing area and the second authentication information storing area are overlapped with each other by a registration unit.

Yet another aspect of the present invention provides a biological authentication method which includes: a storing step of storing biological information in a predetermined area of a storing unit; a first authentication step of authenticating reception of a first service based on the biological information read from the predetermined area; and a second authentication step of authenticating reception of a second service different from the first service, based on the biological information read from the predetermined area.

As described above, according to the present invention, it is possible to prevent a plurality of pieces of identical biological information from being registered in a storage medium when the identical biological information is used as authentication data for different services. This makes it possible to store information into the storage medium with high efficiency, thereby achieving apparatuses and the like that can perform biological authentication on each of a plurality of services.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Hereinafter, an embodiment to which the present invention is applied will be described in detail with reference to the drawings.

(1) Configuration of Communication System

Figure 1:
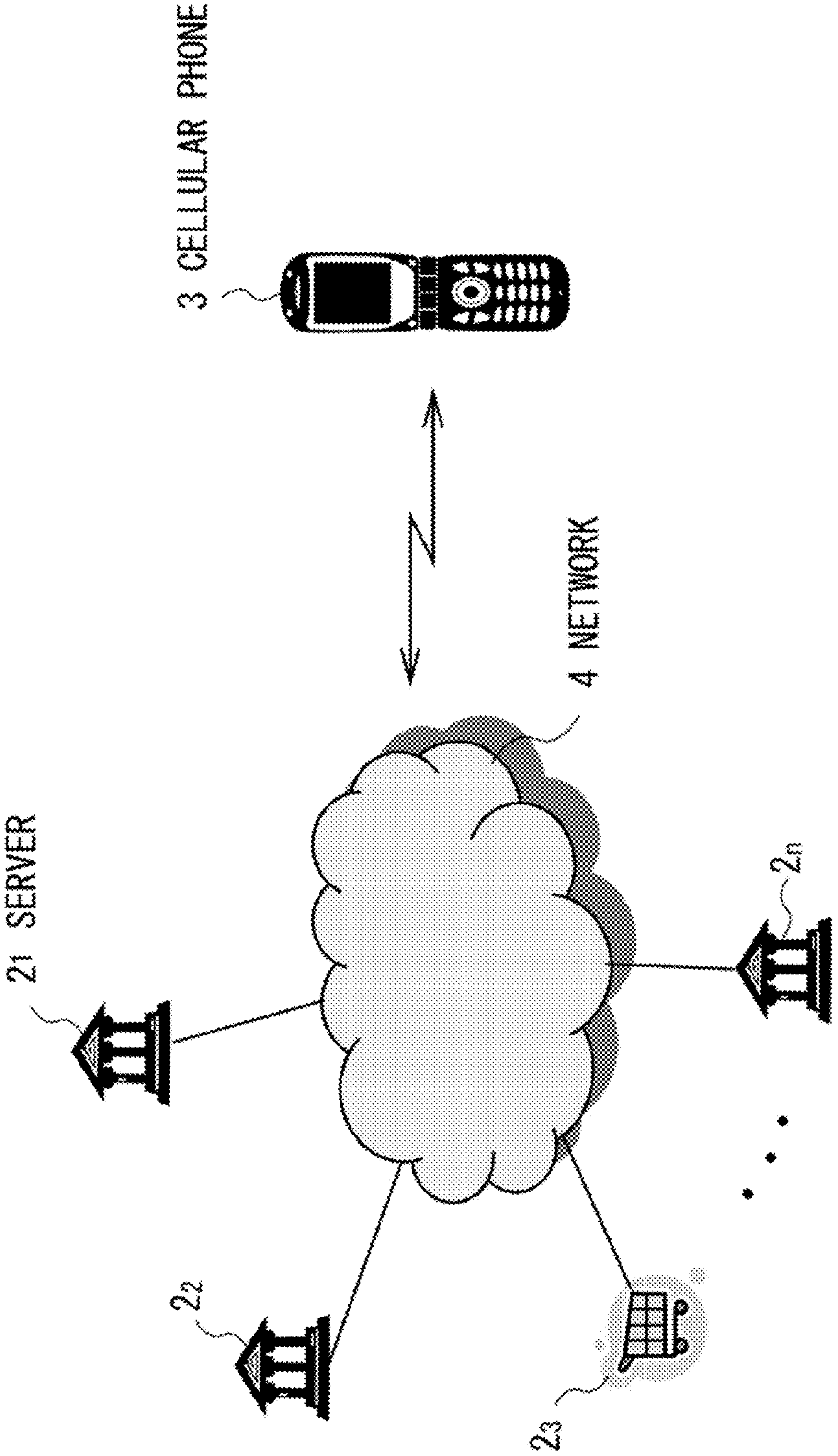
FIG. 1 is a schematic diagram showing the configuration of a communication system according to an embodiment of the present invention.

FIG. 1 shows the overall configuration of a communication system 1 according to the present embodiment. In this communication system 1, a plurality of servers $\mathbf{2}_1, \mathbf{2}_2, \ldots, \mathbf{2}_n$ and a cellular phone 3 are connected over a network 4, such as the Internet and a next generation network (NGN), so that they are capable of transmitting and receiving various types of data.

When transmitting and receiving confidential information such as credit card information and personal information, each of the servers $\mathbf{2}_1, \mathbf{2}_2, \ldots, \mathbf{2}_n$ and the cellular phone 3 encrypt and decrypt the information by using, for example, secure socket layer (SSL) or other security techniques.

In this embodiment, the servers $\mathbf{2}_1, \mathbf{2}_2, \ldots, \mathbf{2}_n$ provide respective different services such as checking a bank account and purchasing products over the Internet. When each server $\mathbf{2}_1, \mathbf{2}_2, \ldots, \mathbf{2}_n$ provides a service to the cellular phone 3 for the first time, it gives a registration command to the cellular phone 3, indicating that biological information intended for authenticating the reception of its own service shall be registered. When the server $\mathbf{2}_1, \mathbf{2}_2, \ldots, \mathbf{2}_n$ provides services to the cellular phone 3 for the second and subsequent times, it gives an authentication command to the cellular phone 3, indicating that authentication processing shall be performed using the biological information.

In the meantime, when a registration command is given from a server $\mathbf{2}_x$ ($\mathbf{2}_1, \mathbf{2}_2, \ldots$, or $\mathbf{2}_n$), the cellular phone 3 prompts its user to capture an image of his/her finger veins, extracts information pertaining to veins (hereinafter, referred to as vein information) from the image that is input as a result of the capturing, and registers the same into its internal memory.

When an authentication command is given from the server $\mathbf{2}_x$, the cellular phone 3 prompts its user to capture an image of his/her veins, and determines whether or not the vein information extracted from the image that is input as a result of the image capturing coincides with the vein information registered in the internal memory.

The cellular phone 3 then transmits the determination whether or not the registered vein information and the input vein information coincide with each other to the communicating server $\mathbf{2}_x$. Note that the cellular phone 3 can receive services from the communicating server $\mathbf{2}_x$ only if the registered vein information and the input vein information are determined to be coincident (if successfully authenticated).

(2) Configuration of Cellular Phone

Next, the configuration of this cellular phone 3 will be described with reference to FIG. 2. This cellular phone 3 includes an image pickup unit 12, a memory 13, a tamper resistant memory 14, a communication unit 15, a display unit 16, and a voice output unit 17 which are each connected to a control unit 10 via a bus 18. An operation unit 11 is also connected to the control unit 10.

The control unit 10 is configured as a computer, including a central processing unit (CPU) which governs the control of the entire cellular phone 3, a read only memory (ROM) which contains various types of programs, setting information, and the like, and a random access memory (RAM) which functions as a work memory of the CPU.

Based on programs that correspond to instructions given from the operation unit 11, this control unit 10 controls the image pickup unit 12, the memory 13, the communication unit 15, the display unit 16, and the voice output unit 17 accordingly to perform processing corresponding to the instructions, such as calling processing, speech processing, mail creation processing, and mail transfer processing.

The control unit 10 has a mode (hereinafter, referred to as vein registration mode) for registering veins of the user to be registered (hereinafter, referred to as registrant) and a mode (hereinafter, referred to as authentication mode) for determining the presence or absence of the registrant in person. Based on programs corresponding to the vein registration mode or the authentication mode, the control unit 10 controls the image pickup unit 12, the memory 13, the tamper resistant memory 14, the communication unit 15, the display unit 16, and the voice output unit 17 accordingly to perform vein registration processing or authentication processing.

The image pickup unit 12 generates and acquires an image of a subject lying in its image pickup range as image data, and sends the acquired image data to the control unit 10.

When in the vein registration mode or in the authentication mode, the image pickup unit 12 also irradiates a target surface for a finger to be put on (hereinafter, referred to as finger position surface) with light (hereinafter, referred to as near-infrared light) that has a wavelength falling within a wavelength band having the characteristic of being specifically absorbable to both deoxygenated hemoglobin and oxygenated hemoglobin (700 nm to 900 nm). The image pickup unit 12 then generates and acquires an image of veins inside the biological location put on the finger position surface (hereinafter, referred to as vein image) in the form of data (hereinafter, referred to as vein image data), and sends the acquired vein image data to the control unit 10.

The memory 13 is intended to store various information other than vein information extracted from vein image data, and stores and reads it into/from predetermined areas specified by the control unit 10.

The tamper resistant memory 14 is intended to store vein information extracted from vein image data, and stores and reads it into/from predetermined areas specified by the control unit 10. For example, if the capacity allocated for a single piece of vein information is 512 bytes, this tamper resistant memory 14 preferably has a capacity of 8 Kbytes or so. This makes it possible to retain 16 pieces of vein information as templates. Consequently, when this cellular phone 3 is used by an individual or even when this cellular phone 3 is used by limited persons, it is possible to retain a sufficient number of pieces of template data.

The communication unit 15 transmits and receives signals to/from the network 4 (FIG. 1), the communication line. Specifically, the communication unit 15 modulates input data to be communicated by using a predetermined modulation method such as orthogonal frequency division multiplex (OFDM), and transmits the resulting modulated signal to a base station through an antenna (not shown). In the meantime, the communication unit 15 demodulates signals received through the antenna by a predetermined demodulation method, and sends the resulting demodulated data to the control unit 10.

The display unit 16 displays characters and graphics on-screen based on display data supplied from the control unit 10. The voice output unit 17 outputs voices from a speaker based on voice data supplied from the control unit 10.

(2-1) Vein Registration Mode

Next, the vein registration mode will be described. When receiving a service from a communicating server $2_x$ in communication and connection over the network 4 for the first time, the control unit 10 is given a command to register biological information, from this server $2_x$ through the communication unit 15 (FIG. 2).

Figure 2:
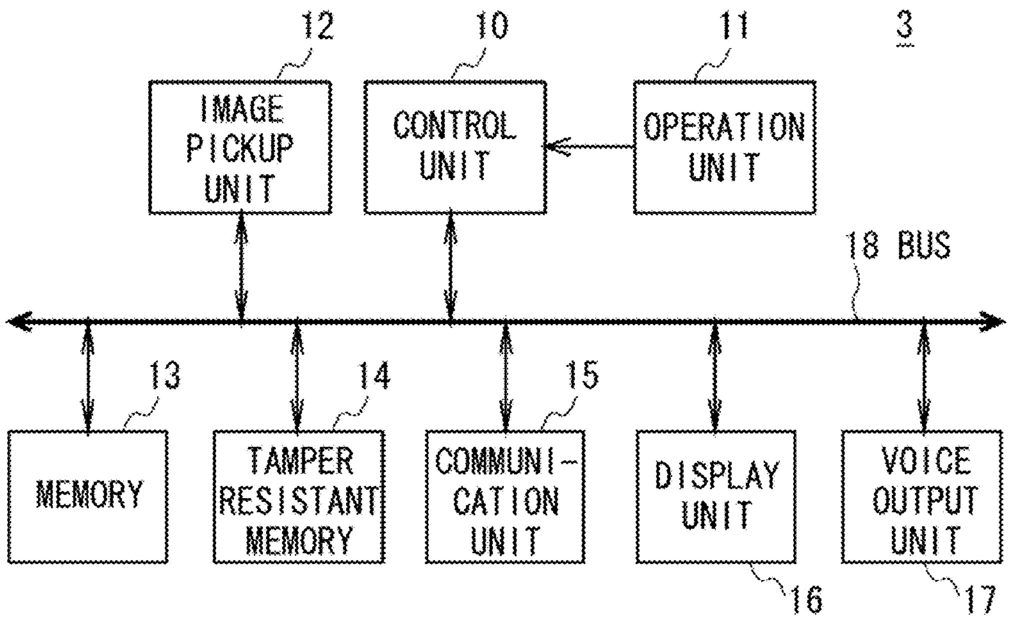
FIG. 2 is a block diagram showing the circuit configuration of a cellular phone.
Figure 3:
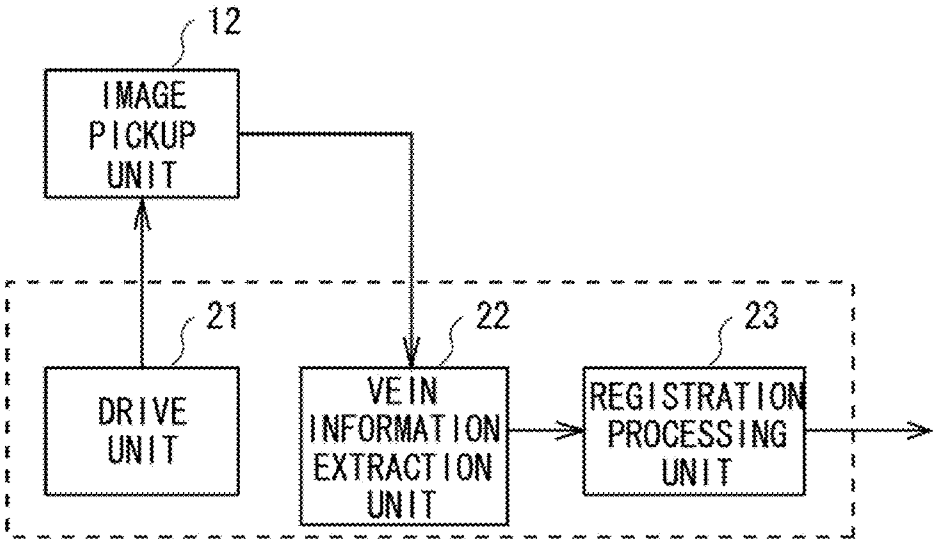
FIG. 3 is a block diagram showing the functional configuration of a control unit in vein registration mode.

In this case, the control unit 10 makes a notification to put a finger on the finger position surface through at least either one of the display unit 16 (FIG. 2) and the voice output unit 17 (FIG. 2). As shown in FIG. 3, the control unit 10 then functions as a drive unit 21, a vein information extraction unit 22, and a registration processing unit 23.

The drive unit 21 drives the image pickup unit 12 to acquire vein image data. More specifically, the drive unit 21 drives a light source of the image pickup unit 12 to irradiate the finger position surface with near-infrared light. The drive unit 21 also adjusts the lens position of an optical lens in the image pickup unit 12 so as to focus on the subject. Moreover, based on a predetermined exposure value (EV), the drive unit 21 also adjusts the aperture value of a diaphragm in the image pickup unit 12 and adjusts the shutter speed (exposure time) of the image pickup device.

The vein information extraction unit 22 extracts vein information from veins that show in the vein image information supplied from the image pickup unit 12 as a result of the image capturing by the image pickup unit 12. For this vein information, various types of information may be employed including: vein images in which the widthwise centers of vessels or intensity peaks of the same are extracted; all or some of the widthwise centers of the vessels or the intensity peaks; and curve approximation parameters on the veins.

Figure 4:
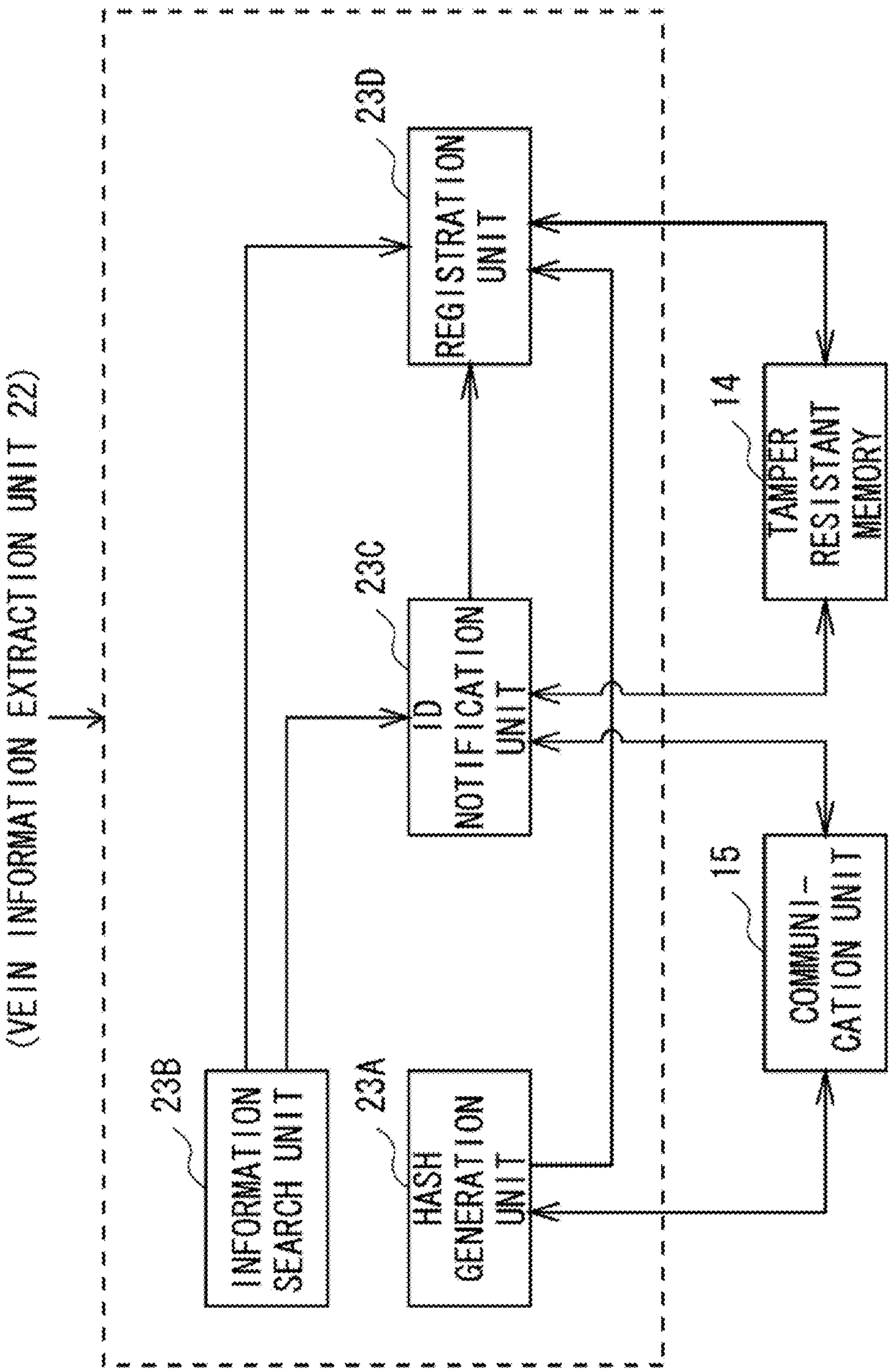
FIG. 4 is a block diagram showing the configuration of a registration processing unit.

As shown in FIG. 4, the registration processing unit 23 includes a hash generation unit 23A, an information search unit 23B, an ID notification unit 23C, and a registration unit 23D. The hash generation unit 23A requests the communicating server $2_x$, through the communication unit 15 (FIG. 2), to transmit message data for generating a hash value, and generates a hash value based on message data that is returned from the server $2_x$ through the communication unit 15 in response to this transmission request (FIG. 5: step SP1).

Figure 5:
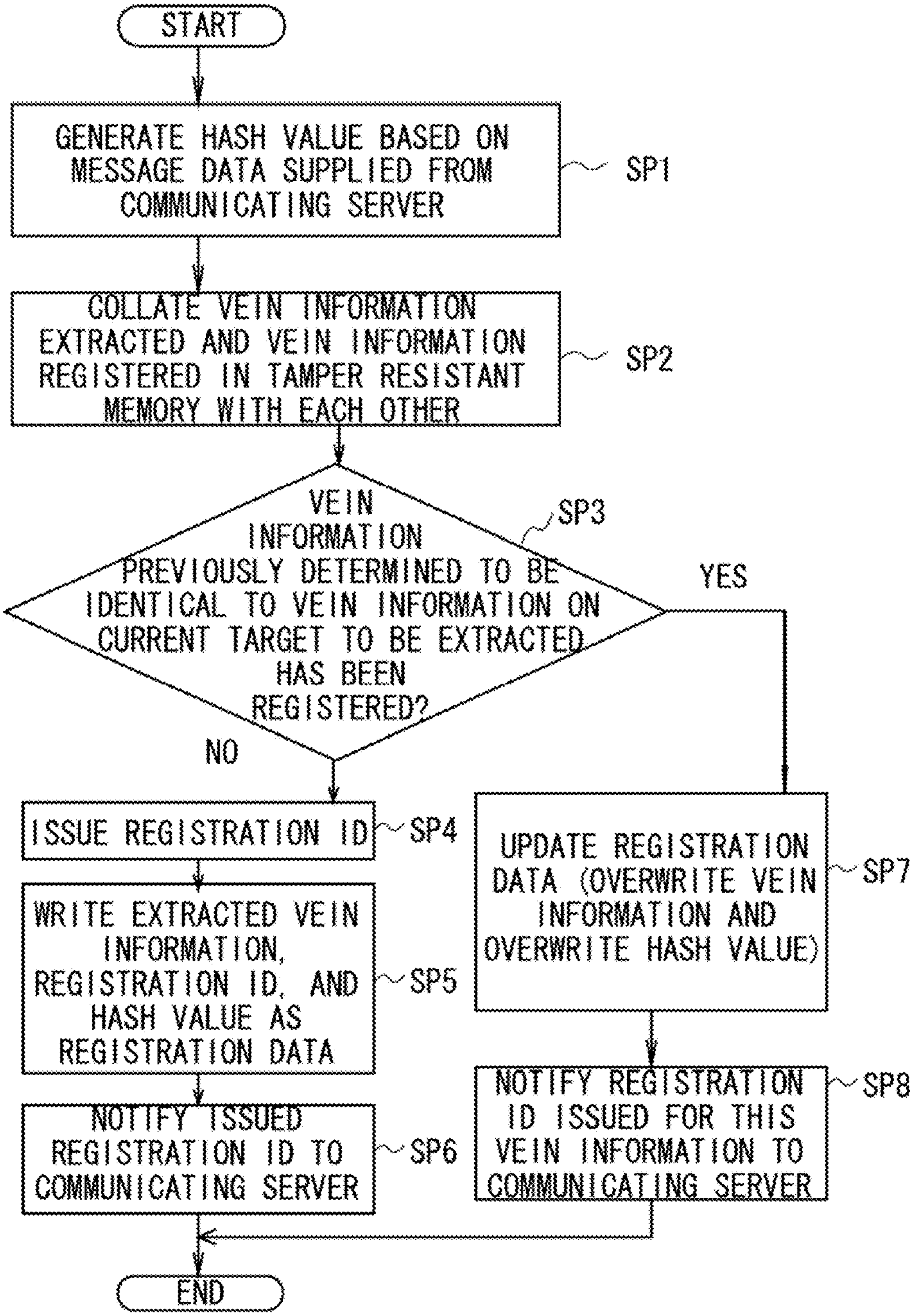
FIG. 5 is a flowchart showing the procedure of registration processing.

The search unit 23B collates vein information that is supplied from the vein information extraction unit 22 with vein information that is previously registered in the tamper resistant memory 14 (FIG. 5: step SP2). The search unit 23B searches the tamper resistant memory 14 for a previously-registered piece of vein information with which a correlation value or the like for indicating the degree of similarity to the vein information supplied from the vein information extraction unit 22 reaches or exceeds a limit value (hereinafter, referred to as threshold) for being identical (FIG. 5: step SP3).

The search result from this search unit 23B is notified to the ID notification unit 23C and the registration unit 23D. Now, suppose that no piece of vein information is found in the tamper resistant memory 14 that is determined to be coincident with the vein information supplied from the vein information extraction unit 22 (FIG. 5: step SP3 (NO)). This means that the vein portion of the finger imaged in this vein registration mode has not been registered before, or equivalently, the finger's vein portion extracted by the vein information extraction unit 22 is yet to be registered.

In this case, the ID notification unit 23C issues a number or other unique ID (hereinafter, referred to as registration ID) with respect to the vein information supplied from the vein information extraction unit 22 (FIG. 5: step SP4). The registration unit 23D also writes the hash value generated by the hash generation unit 23A, the registration ID issued by the ID notification unit 23C, and the vein information supplied from the vein information extraction unit 22 as registration data, thereby registering them in the tamper resistant memory 14 (FIG. 5: step SP5). Subsequently, the ID notification unit 23C notifies the communicating server $2_x$ through the communication unit 15 (FIG. 2) of the issued registration ID (FIG. 5: step SP6), and terminates the registration processing.

Suppose, on the other hand, that a piece of vein information is found in the tamper resistant memory 14 that is determined to be coincident with the vein information supplied from the vein information extraction unit 22 (FIG. 5: step SP3 (YES)). This means that the finger's vein portion imaged in this vein registration mode has been registered before.

In this case, the registration unit 23D updates the registration data (FIG. 5: step SP7). Specifically, the vein information included in the registration data is overwritten with the vein information supplied from the vein information extraction unit 22, and the hash value based on the message data from the communicating server $2_x$ is appended to that registration data. Subsequently, the ID notification unit 23C notifies the communicating server $2_x$ through the communication unit 15 (FIG. 2) of the registration ID that is included in the registration data updated (FIG. 5: step SP8), and terminates the registration processing.

As described above, when an identical vein portion is registered for a plurality of servers 2, the registration processing unit 23 will register not the respective pieces of vein information on the identical vein portion into the tamper resistant memory 14 but only the latest, one piece of vein information. Consequently, ever if the same vein information is used as authentication data for a plurality of servers 2, only a single piece of vein information is registered in this cellular phone 3, thus allowing a reduction of the unnecessary use of the tamper resistant memory 14.

The registration processing unit 23 also associates the vein information that is registered or authentication of a plurality of servers 2, with hash values that are based on message data acquired from the respective servers 2. This cellular phone 3 can thus grasp how many servers the vein information is intended for authentication of.

Besides, when registering vein information, the registration processing unit 23 supplies the communicating server $2_x$, external to the cellular phone 3, with only the registration ID that is issued for the vein information. This cellular phone 3 can thus maintain confidentiality as to the information pertaining to veins (vein information) which are said to be unchangeable in one's life.

It should be noted that while living body's veins in themselves are said to be unchangeable throughout one's lifetime, veins shown in vein images can vary, for example, depending on the amount of fat in the living body. In other words, if a finger has a more or less amount of fat when imaged for the second time than for the first time, the conditions of veins seen in the vein image (the contents of the vein information) sometimes vary because of the difference.

The registration processing unit 23 according to this embodiment updates, not discards, the vein information that is being registered if the vein information being registered has been registered before. This makes it possible to register and retain vein information that reflects the latest states of fingers, thereby lowering false rejection rate (FRR) ascribable to a change of state of the fingers.

(2-1-1) Data Structure of Registration Data

Figure 6:
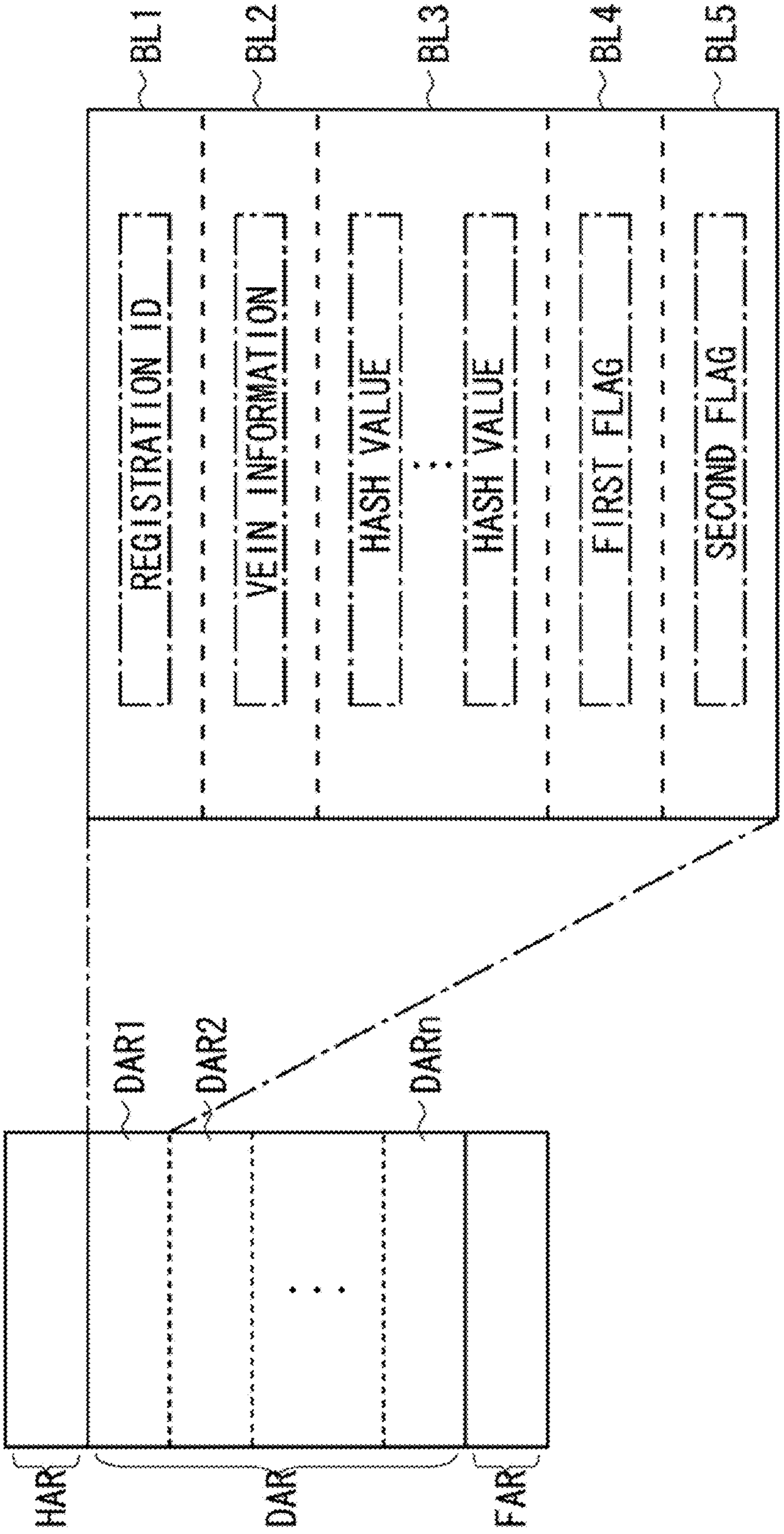
FIG. 6 is a schematic diagram showing the data structure of registration data.

Next, description will be given of the data structure of the registration data. As shown in FIG. 6, the registration data structurally includes a header area HAR, a data area DAR, and a footer area FAR. The data area DAR is allocated to areas DAR, to DAR, for storing a plurality of pieces of vein information (hereinafter, referred to as biological information storing areas) Each of the biological information storing areas $DAR_1$ to $DAR_n$ has a block BL1 for storing a registration ID which is issued by the registration processing unit 23, a block BL2 for storing vein information which is extracted by the vein information extraction unit 22, and a block BL3 for storing a hash value which is generated by the registration processing unit 23.

The hash value to be stored in the block BL3 is not necessarily one in number. As has been discussed at step SP7 of FIG. 5, if an identical vein portion is registered for a plurality of servers 2, two or more hash values generated based on message data acquired from the respective servers are associated. That is, the hash values stored in this hash block BL3 are one of the pieces of information for identifying the servers on which the vein information is registered, and the number of hash values represents the number of servers in which the same vein portion is used for registration.

In addition to the above configuration, each of the biological information storing areas $DAR_1$ to $DAR_m$ also has blocks allocated for indicating whether or not to restrict update of registration data. Specifically, as shown in FIG. 6, there are assigned a first flag block BL4 for indicating whether or not to inhibit the update of the vein information stored in the block BL2, and a second flag block BL5 for indicating whether or not to inhibit the update of the vein information and the hash value(s) stored in the blocks BL2 and BL3.

The first and second flags in these blocks BL4 and BL5 are provided out of concern that the vein information first registered would be altered and that the vein information would be registered for a plurality of servers 2, as is the case with financial services and the like. These flags are usually set off (put down), and will be set on (put up) at the first time of registration for one, two, or more servers 2 that is/are permitted to restrict the update of the registration data.

In the foregoing registration processing (FIG. 5), identical pieces of vein information in principle will not be registered in the tamper resistant memory 14. When registration data is generated with the first flag or the second flag on, however, the same pieces of vein information can coexist on an exceptional basis as registration data having the first flag or second flag on and registration data having the flag off.

(2-1-2) Generating Registration Data with Flag on

Now, description will be given of the case of generating registration data with the first flag or second flag on, referring to the flowchart of FIG. 7 in which corresponding parts to those of FIG. 5 will be designated by like reference numerals.

When the registration processing unit 23 requests transmission of message data for generating a hash value (FIG. 7: step SP1), the server 2 returns message data including a content to set the first or second flag on if it is permitted to restrict the update of the registration data.

Figure 7:
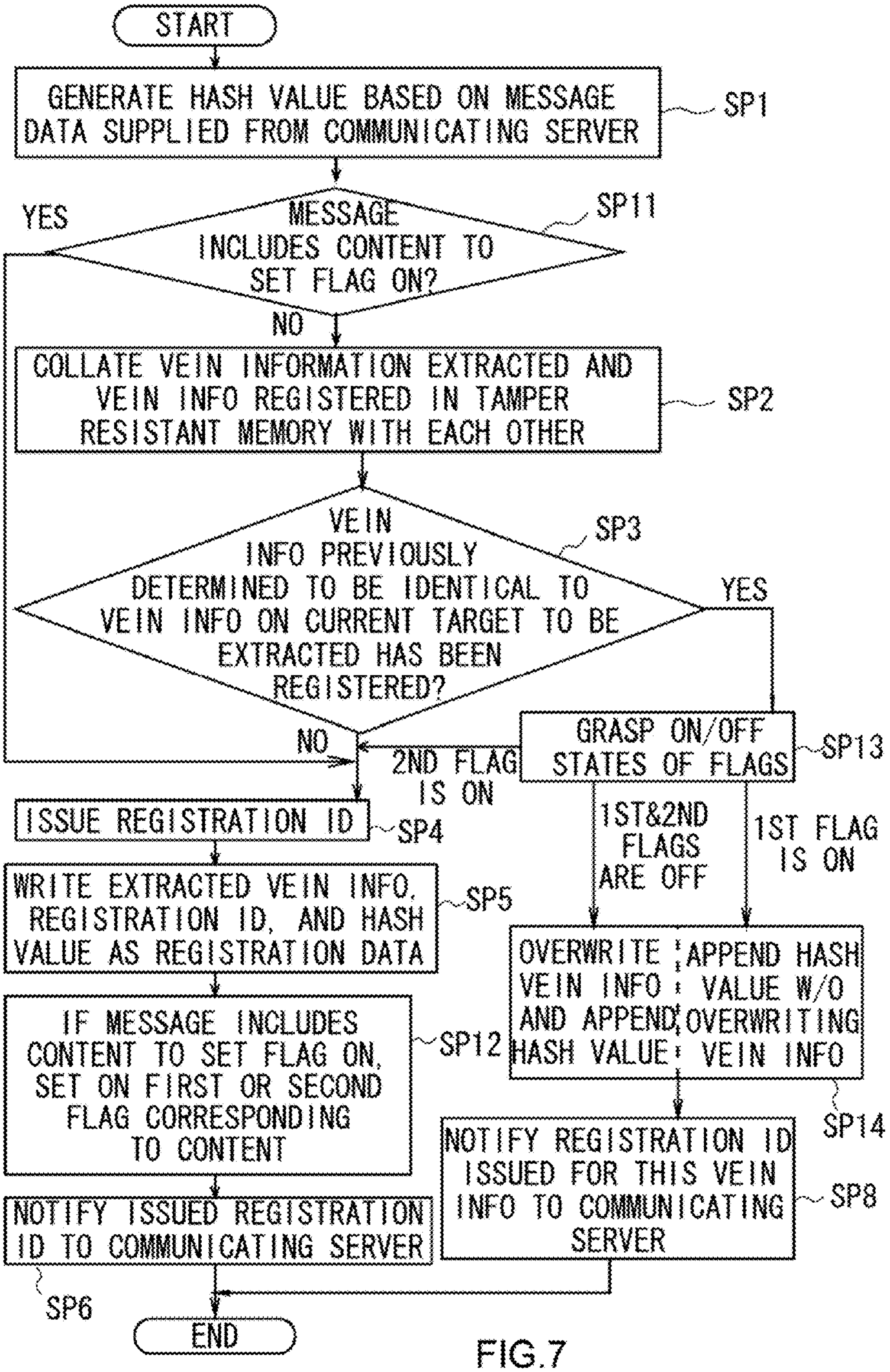
FIG. 7 is a flowchart showing the procedure of the registration processing (when generating or updating registration data with a flag on)

The registration processing unit 23 generates a hash value based on this message data (FIG. 7: step SP1), and determines whether or not the message data includes the content to set the first flag or the second flag on (FIG. 7: step SP11).

If the message data does not include the content to set the first flag or the second flag on, the registration processing unit 23 searches the tamper resistant memory 14, as described above, for a registered piece of vein information that is identical or generally identical to the vein information supplied from the vein information extraction unit 22 (FIG. 7: step SP3).

On the other hand, if the message data includes the content to set the first flag or the second flag on, the registration processing unit 23 issues a registration ID without searching the tamper resistant memory 14 for the registered vein information that is identical or generally identical to the vein information supplied from the vein information extraction unit 22 (FIG. 7: step SP4), and writes the hash value, the registration ID, and the vein information into an unoccupied biological information storing area DAR for new registration (FIG. 7: step SP5). The registration processing unit 23 then sets on either one of the first flag and the second flag in the blocks BL4 and BL5 of the registration data, depending on the content of the message data (FIG. 7: step SP12).

As above, when generating registration data with the first flag or the second flag on, vein information that is being registered will be registered newly regardless of whether or not any vein information has already been registered that is identical or generally identical to the vein information being registered.

(2-1-3) Updating Registration Data with Flag on

Next, with reference to the flowchart shown in FIG. 7, description will be given of the case of updating registration data that has the first flag or the second flag on (FIG. 7: step SP7).

When vein information identical or generally identical to the vein information supplied from the vein information extraction unit 22 is retrieved from the tamper resistant memory 14 (FIG. 7: step SP3 (YES)), the registration processing unit 23 grasps if the registration data including this retrieved vein information has the first flag or second flag on (FIG. 7: step SP13).

Here, if both the first flag and the second flag of the registration data are off (FIG. 7: step SP14), the vein information stored in the block BL2 of this registration data is overwritten with the vein information supplied from the vein information extraction unit 22, and the hash value is appended to the block BL3 of this registration data to update the registration data (FIG. 7: step SP14). As a result, the vein information in this case is regularly registered to reflect the latest state of the finger, and is used when receiving services from the respective two or more servers.

If the first flag of the registration data is on (FIG. 7: step SP14), the registration processing unit 23 appends the hash data to the block BL3 of this registration data to update the registration data without overwriting the vein information stored in the block BL2 of this registration data (FIG. 7: step SP14). As a result, the vein information with the first flag on is used when receiving services from the respective two or more servers, whereas its update is inhibited to maintain the state as is registered newly.

Now, if the second flag of the registration data is on (FIG. 7: step SP14), the registration processing unit 23 issues a registration ID without updating this registration data (FIG. 7: step SP4). The registration processing unit 23 then writes the registration ID, the hash value, and the vein information supplied from the vein information extraction unit 22 into an unoccupied biological information storing area DAR for new registration (FIG. 7: step SP5). In this case, the registration processing unit 23 notifies the registration ID to the communicating server $\mathbf{2}_x$ (FIG. 7: step SP6) without setting the first or second flag on (FIG. 7: step SP12). Consequently, the vein information with the second flag on is used only when receiving service from one server. This ensures the uniqueness of this vein information.

(2-2) Authentication Mode

Next, the authentication mode will be described. When receiving services from a server $\mathbf{2}_x$ in communication and connection over the network 4 for the second and subsequent times, i.e., if the server $\mathbf{2}_x$ has acquired some registration ID in the foregoing vein registration mode, the control unit 10 is given an authentication command and the registration ID from this server $\mathbf{2}_x$ through the communication unit 15 (FIG. 2).

Figure 8:
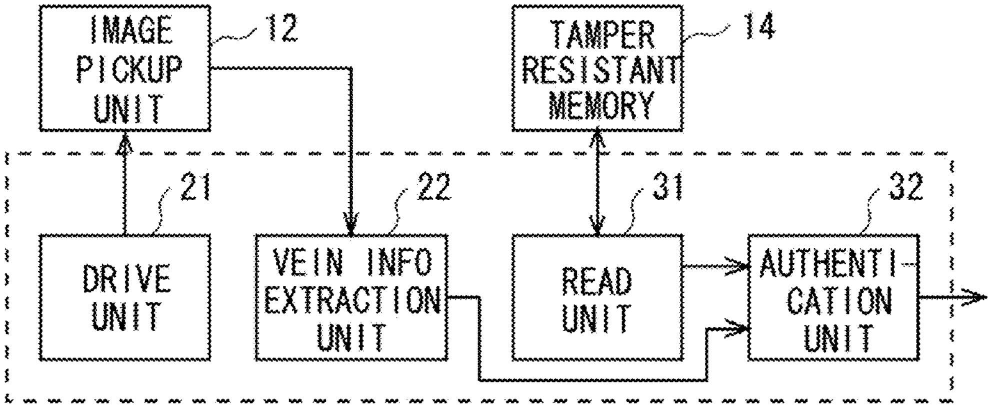
FIG. 8 is a block diagram showing the functional configuration of the control unit in authentication mode.

In this case, the control unit 10 notifies through at least either one of the display unit 16 (FIG. 2) and the voice output unit 17 (FIG. 2) to put a finger on the finger position surface. Subsequently, as shown in FIG. 8 in which corresponding parts to those of FIG. 3 are designated by like reference numerals, the control unit 10 functions as the drive unit 21, the vein information extraction unit 22, a read unit 31, and an authentication unit 32.

The drive unit 21 drives the image pickup unit 12. The vein information extraction unit 22 extracts vein information based on vein image data supplied from the image pickup unit 12.

The read unit 31 searches the registration data stored in the tamper resistant memory 14 for a piece of data that has the same registration ID as retained in the server $\mathbf{2}_x$. If the same registration ID as retained in the server $\mathbf{2}_x$ is found, the read unit 31 reads the vein information and the hash value that are associated with this registration ID, and supplies them to the authentication unit 32.

Figure 9:
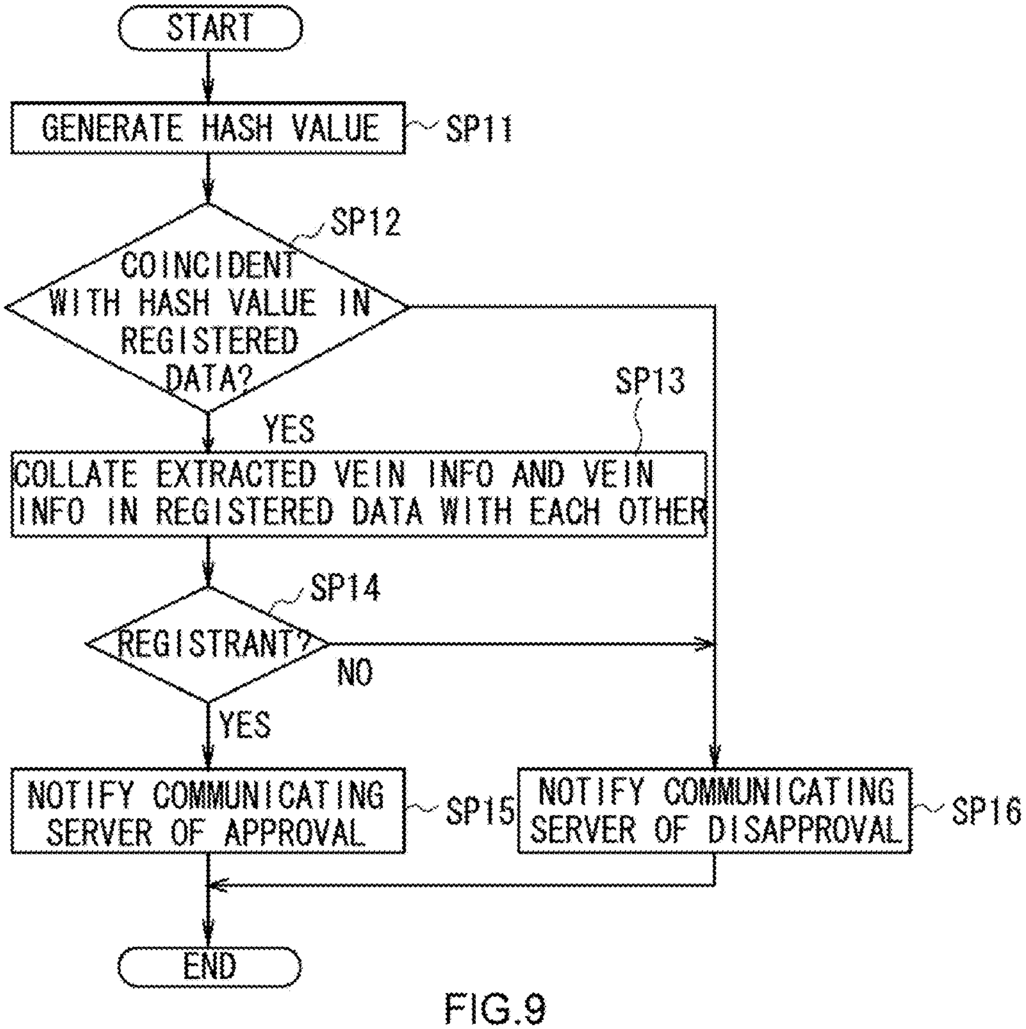
FIG. 9 is a flowchart showing the procedure of authentication processing.

The authentication unit 32 requests of the communicating server $\mathbf{2}_x$ the same message data for generating a hash value as transmitted in the foregoing vein registration mode, and generates a hash value based on the message data that is returned in response to this transmission request (FIG. 9: step SP11).

The authentication unit 32 then compares the hash value with that read from the tamper resistant memory 14 by the read unit 31, and determines whether or not these values coincide with each other (FIG. 9: step SP12).

Suppose here that the hash values are determined to be coincident (FIG. 9: step SP12 (YES)), which means an extremely low possibility of holding communication with a third party that is spoofing the server $\mathbf{2}_x$. In this case, the authentication unit 32 collates the vein information that is read from the tamper resistant memory 14 by the read unit 31 and the vein information that is extracted by the vein information extraction unit 22 (FIG. 9: step SP13), and determines whether or not they coincide with each other (FIG. 9: step SP14).

If the two pieces of vein information are determined to be coincident (FIG. 9: step SP14 (YES)), the authentication unit 32 notifies the communicating server $\mathbf{2}_x$ through the communication unit 15 (FIG. 2) that registrant authentication is granted (FIG. 9: step SP15). In this case, the control unit 10 and the communicating server $\mathbf{2}_x$ exchange various types of data for receiving services from this server $\mathbf{2}_x$.

On the other hand, if the hash values are determined not to be coincident (FIG. 9: step SP12 (NO)) or if the two pieces of vein information are determined not to be coincident (FIG. 9: step SP14 (NO)), the authentication unit 32 notifies the communicating server $\mathbf{2}_x$ through the communication unit 15 (FIG. 2) that registrant authentication is not granted (FIG. 9: step SP16).

Incidentally, if the registration data does not include the same registration ID as retained in the server $\mathbf{2}_x$, no vein information will be given to the authentication unit 32. As a result, the authentication unit 32 determines not to grant registrant authentication.

This control unit 10 can execute the authentication mode in this way.

(3) Operation and Effect

With the foregoing configuration, when this cellular phone 3 acquires vein information to be registered, it determines whether or not the vein information previously registered in the tamper resistant memory 14 includes any piece that coincides with the vein information to be registered (FIG. 7 (FIG. 5): step SP2).

If the vein information being registered and a piece of vein information registered previously are determined to be coincident (the degree of similarity (such as correlation value) therebetween reaches or exceeds a limit value for being identical) (FIG. 7 (FIG. 5): step SP3 (YES)), this cellular phone 3 selects either new registration or update registration depending on the state of the flag that indicates whether or not to inhibit the update of this vein information registered previously (FIG. 7: step SP13). For update registration, the cellular phone 3 overwrites the vein information registered previously with the vein information to be registered, thereby updating the vein information being registered (FIG. 7 (FIG. 5): step SP7 (SP14)).

For example, suppose that vein information for authenticating reception of a first service provided by the server $\mathbf{2}_1$ is stored in the tamper resistant memory 14, and vein information for authenticating reception of a second service provided by the server $\mathbf{2}_2$ is acquired in this state. Then, the vein information for this server $\mathbf{2}_2$ is updated as a single piece of vein information for the servers $\mathbf{2}_1$ and $\mathbf{2}_2$ if it coincides with the vein information for the server $\mathbf{2}_1$, stored in the tamper resistant memory 14.

In other words, the biological information storing area DAR that contains the previously-registered vein information for the server $\mathbf{2}_1$ is used as an area allocated for the vein information for the servers $\mathbf{2}_1$ and $\mathbf{2}_2$, not unoccupied biological information storing areas DAR being used as an area allocated for the vein information for the server $\mathbf{2}_2$.

Consequently, even if identical vein information is used as authentication data for different services (servers 2), this cellular phone 3 can prevent the same pieces of vein information for the respective servers 2 from being each registered in the tamper resistant memory 14.

Moreover, when registering new vein information or when updating vein information registered previously, this cellular phone 3 generates a hash value based on message data supplied from the communicating server $\mathbf{2}_x$, and registers the vein information in the tamper resistant memory 14 in association with this hash value.

If a finger's vein portion has already been registered, this cellular phone 3 then registers the latest one piece of vein information alone in the tamper resistant memory 14, and associates the vein information with the hash values that are based on the message data acquired from the respective servers 2. This makes it possible to reduce the unnecessary use of the tamper resistant memory 14, and associate a single piece of vein information as the authentication target for a plurality of servers 2 (services). As a result, this cellular phone 3 can show, if necessary, how many servers the vein information is intended for authentication of.

According to the foregoing configuration, since pieces of vein information on an identical vein portion can be prevented from being registered in the tamper resistant memory 14, it is possible to achieve a cellular phone 3 that can reduce the unnecessary use of the tamper resistant memory 14.

(4) Other Embodiments

The foregoing embodiment has dealt with the case where living body's vein information is applied as the biological information. The present invention is not limited thereto, however, and various other types of information on a living body are also applicable, including information pertaining to fingerprints, lip prints, and voiceprints. In this connection, while the image pickup unit 12 and the vein information extraction unit 22 have been used to acquire vein information in the foregoing embodiment, the acquisition techniques may be switched from the image pickup unit 12 and the vein information extraction unit 22 to technical matters for acquiring the biological information applied.

The foregoing embodiment has also dealt with the case where the tamper resistant memory 14 is applied as the memory for vein information to be stored in. Nevertheless, the present invention is also applicable to, e.g., a subscriber identity module (SIM) card, universal subscriber identity module (UIM), memory stick (a registered trademark of Sony), and so on. The application of SIM or UIM allows roaming of integrated circuit (IC) chips and the like for improved user convenience.

The foregoing embodiment has also dealt with the case where the hash generation unit 23A is applied as the generation unit for generating identification data for identifying a communication party based on message data supplied from the communication party, the identification data having a data volume smaller than that of biological information. The present invention is not limited thereto, however, and may employ data strings obtained from one-way functions other than hash functions, data strings based on predetermined encryption theories, simple numbers, and so on.

The foregoing embodiment has also dealt with the case where the cellular phone 3 is applied. The present invention is not limited thereto, however, and it is possible to apply various other types of electronic apparatuses that have communication capabilities, such as personal digital assistants (PDA), television sets, and personal computers. In the applications of portable communication devices that have personally-assigned communication IDs such as telephone numbers and mail addresses, a vein image of the same finger is often input for different services. The present invention, capable of reducing the unnecessary use of the tamper resistant memory 14 in particular, is thus particularly useful.

The present invention is applicable to the field of biometrics authentication.

It should be understood by those skilled in the art that various modifications, combinations, sub-combinations and alterations may occur depending on design requirements and other factors insofar as they are within the scope of the appended claims or the equivalents thereof.

What is claimed is:

1. A biological information storing apparatus comprising:

a biological information storing unit for storing biological information for authenticating reception of a first service;

a biological information acquisition unit for acquiring biological information for authenticating reception of a second service different from the first service; and a determination unit for determining whether or not the biological information acquired by the biological information acquisition unit and the biological information stored in the biological information storing unit coincide with each other, wherein when the determination unit determines that the biological information acquired by the biological information acquisition unit and the biological information stored in the biological information storing unit coincide with each other, either the biological information acquired by the biological information acquisition unit or the biological information stored in the biological information storing unit is selected and stored into the biological information storing unit as biological information for authenticating the reception of the first service and the second service.

2. The biological information storing apparatus according to claim 1, wherein when the determination unit determines that the biological information acquired by the biological information acquisition unit and the biological information stored in the biological information storing unit coincide with each other, and the biological information acquired by the biological information acquisition unit is stored instead of the biological information stored in the biological information storing unit.

3. The biological information storing apparatus according to claim 2, wherein the biological information is information showing a vein.

4. The biological information storing apparatus according to claim 1, wherein the biological information storing unit has higher safety than that of a storing unit for storing information other than the biological information.

5. The biological information storing apparatus according to claim 1, wherein the biological information storing unit is a storing unit intended for a portable device, being mounted on a portable device.

6. The biological information storing apparatus according to claim 5, wherein the portable device communicates with a plurality of terminals through a communication line, and receives different services from the respective terminals.

7. The biological information storing apparatus according to claim 6, wherein the portable device has a personally-assigned communication ID.

8. The biological information storing apparatus according to claim 1, wherein when the determination unit determines that the biological information storing unit does not contain any biological information coincident with the biological information acquired by the biological information acquisition unit, a new identification number is given to the biological information acquired by the biological information acquisition unit.

9. The biological information storing apparatus according to claim 1, further comprising a transmission/reception unit for transmitting and receiving a signal to/from a communication line, wherein communication party identification information for identifying a communication party is stored in the biological information storing unit in association with the biological information acquired by the biological information acquisition unit or the biological information stored in the biological information storing unit, the communication party identification information being generated based on a signal received from the communication party in communication and connection through the communication line.

* * * * *